US012749814B2

(12) United States Patent
Chen et al.

(10) Patent No.: US 12,749,814 B2
(45) Date of Patent: Sep. 29, 2026

(54) ANTENNA STRUCTURE AND ELECTRONIC DEVICE

(71) Applicant: WISTRON NEWEB CORPORATION, Hsinchu (TW)

(72) Inventors: Ming-Wei Chen, Hsinchu (TW); Huang-Tse Peng, Hsinchu (TW); Chung-Yen Hsiao, Hsinchu (TW); Kuo-Shih Liu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 170 days.

(21) Appl. No.: 18/772,393

(22) Filed: Jul. 15, 2024

(65) Prior Publication Data

US 2025/0047003 A1 Feb. 6, 2025

Related U.S. Application Data

(60) Provisional application No. 63/517,384, filed on Aug. 3, 2023.

(30) Foreign Application Priority Data

Jan. 23, 2024 (TW) ................................ 113102510

(51) Int. Cl.
*H01Q 9/16* (2006.01)
*H01Q 1/24* (2006.01)
(Continued)

(52) U.S. Cl.
CPC ............... *H01Q 9/16* (2013.01); *H01Q 1/246* (2013.01); *H01Q 5/50* (2015.01); *H01Q 25/001* (2013.01)

(58) Field of Classification Search
CPC ............ H01Q 9/16; H01Q 1/246; H01Q 5/50; H01Q 25/001
See application file for complete search history.

(56) References Cited

U.S. PATENT DOCUMENTS 6,166,702 A * 12/2000 Audenaerde ........... H01Q 9/285 343/810
10,211,531 B2 * 2/2019 Galejs ..................... H01Q 21/26
(Continued)

FOREIGN PATENT DOCUMENTS

CN 1839516 A 9/2006

*Primary Examiner* — Hai V Tran
(74) *Attorney, Agent, or Firm* — McClure, Qualey & Rodack, LLP

(57) ABSTRACT

An antenna structure and an electronic device are provided. The antenna structure is disposed on a carrier of the electronic device and includes a first dipole radiating element perpendicular to a plane, a second dipole radiating element connected to the first dipole radiating element, and a third dipole radiating element connected to the first dipole radiating element and the second dipole radiating element. The first dipole radiating element is configured to generate a first radiation pattern, the second dipole radiating element is configured to generate a second radiation pattern, and the third radiating element is configured to generate a third radiation pattern. The first radiation pattern is omnidirectional radiation on the plane. A polarization direction of the second radiation pattern and a polarization direction of the third radiation pattern are respectively orthogonal to a polarization direction of the first radiation pattern.

18 Claims, 5 Drawing Sheets

(51) Int. Cl.
*H01Q 5/50* (2015.01)
*H01Q 25/00* (2006.01)

(56) References Cited

U.S. PATENT DOCUMENTS

| | | | | |
|---|---|---|---|---|
| 2015/0280324 | A1* | 10/2015 | Petropoulos | H01Q 1/246 343/795 |
| 2016/0301136 | A1* | 10/2016 | Jan | H01Q 5/371 |
| 2023/0223709 | A1* | 7/2023 | Guntupalli | H01Q 25/001 343/702 |
| 2024/0039163 | A1* | 2/2024 | Zhang | H01Q 7/00 |
| 2024/0204423 | A1* | 6/2024 | Li | H01Q 19/10 |

* cited by examiner

ANTENNA STRUCTURE AND ELECTRONIC DEVICE

CROSS-REFERENCE TO RELATED PATENT APPLICATION

This application claims the benefit of priority to Taiwan Patent Application No. 113102510, filed on Jan. 23, 2024 and U.S. Provisional Application No. 63/517,384 filed on Aug. 3, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure and an electronic device capable of generating an omnidirectional radiation pattern in a specific frequency band.

BACKGROUND OF THE DISCLOSURE

Electronic products, such as network routers, routers and miniature base stations, use built-in antennas to communicate with the outside world. Built-in antennas are antennas that are embedded in the electronic products. Generally speaking, implanting antennas into products during the design process can make the products more aesthetically pleasing and easy to use. However, the signal strength and stability of the antenna may be restricted by the space inside the product itself. For example, when the housing of the product is made of metal material, the antenna clearance area is reduced, and the space where the antenna can be installed inside the product is limited, which will affect the radiation efficiency of the antenna.

Therefore, how to overcome the above defects through the improvement of structural design has become one of the important issues to be solved in this field.

SUMMARY OF THE DISCLOSURE

In one aspect, the present disclosure provides an antenna structure, which includes a first dipole radiating piece, a second dipole radiating piece and a third dipole radiating element. The first dipole radiating element is perpendicular to a plane. The second dipole radiating element is connected to the first dipole radiating element. The third dipole radiating element is connected to the first dipole radiating element and the second dipole radiating element. The first dipole radiating element is configured to generate a first radiation pattern, the second dipole radiation element is configured to generate a second radiation pattern, and the third dipole radiation element is configured to generate a third radiation pattern. The first radiation pattern is omnidirectional radiation on the plane. The polarization direction of the second radiation pattern is orthogonal to the polarization direction of the first radiation pattern, and the polarization direction of the third radiation pattern is orthogonal to the polarization direction of the first radiation pattern.

In another aspect, the present disclosure provides an electronic device, which includes a carrier and an antenna structure. The antenna structure is disposed on the carrier. The antenna structure includes a first dipole radiating element, a second dipole radiating element and a third dipole radiating element. The first dipole radiating element is perpendicular to a plane. The second dipole radiating element is connected to the first dipole radiating element. The third dipole radiating element is connected to the first dipole radiating element and the second dipole radiating element. The first dipole radiating element is configured to generate a first radiation pattern, the second dipole radiation element is configured to generate a second radiation pattern, and the third dipole radiation element is configured to generate a third radiation pattern. The first radiation pattern is omnidirectional radiation on the plane. The polarization direction of the second radiation pattern is orthogonal to the polarization direction of the first radiation pattern, and the polarization direction of the third radiation pattern is orthogonal to the polarization direction of the first radiation pattern.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
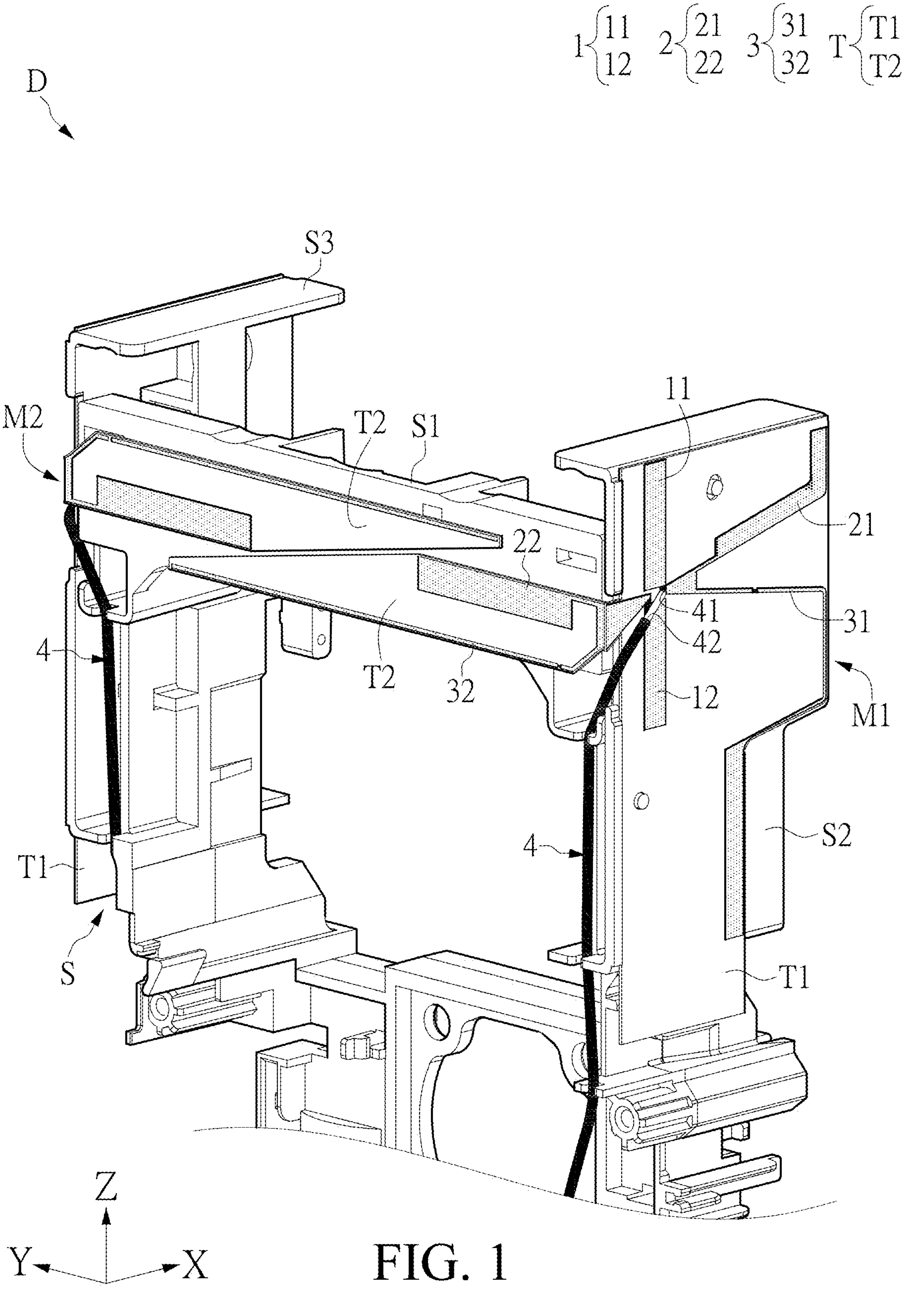
FIG. 1 is a perspective view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "or", as used herein, should include any one or a combination of the associated enlisted items, as the case may be. The term "connect" in the context of the present disclosure means there is a physical connection between two elements and is directly or indirectly connected. The term "couple" in the context of the present disclosure means there is no physical connection between two separated elements, and the two elements are instead connected by their electric field energy where the electric field energy generated by the current of one element excites the electric field energy of the other element.

First Embodiment

Figure 2:
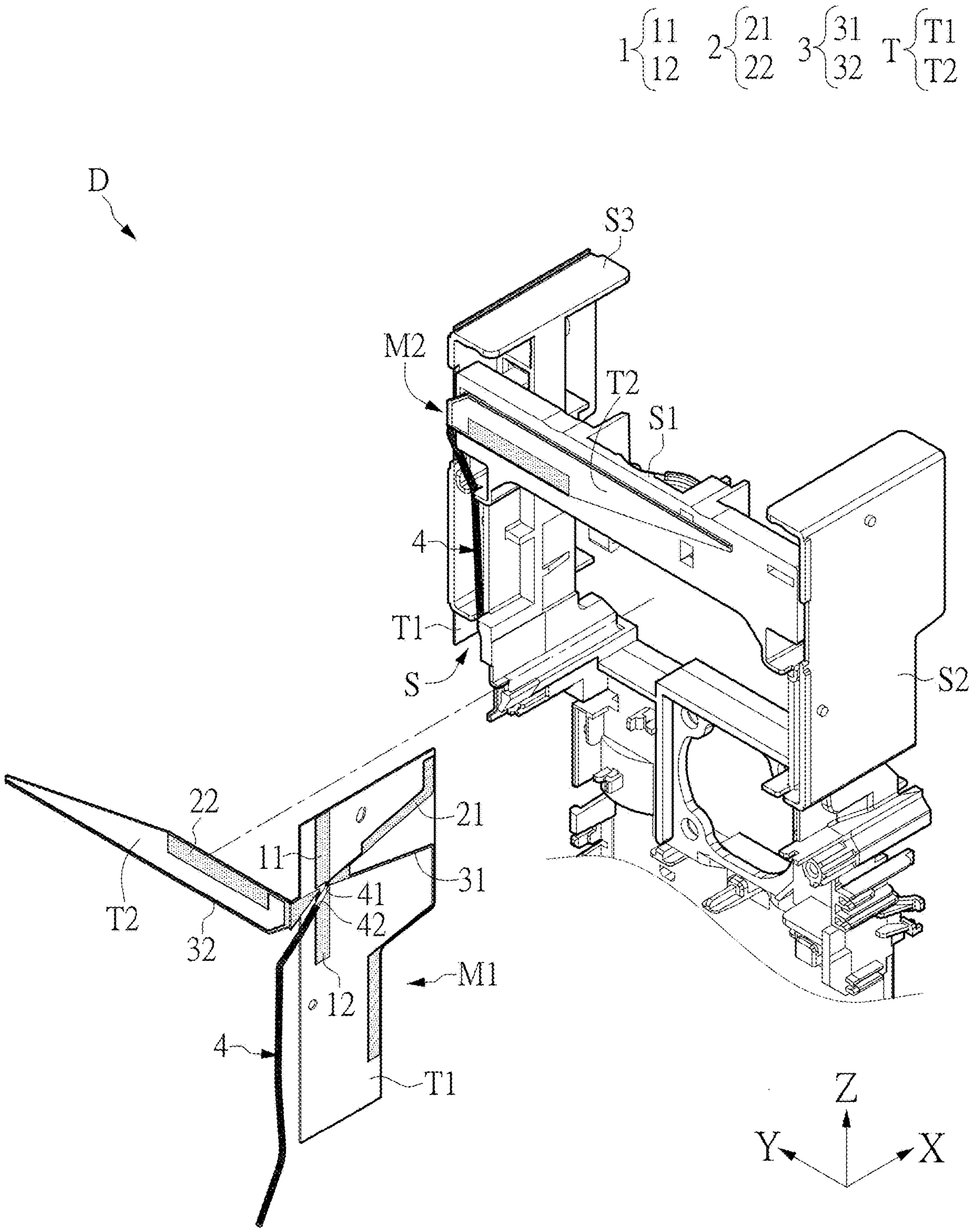
FIG. 2 is a partial exploded view of an electronic device according to the present disclosure.

Referring to FIG. 1 and FIG. 2. FIG. 1 is a perspective view of an electronic device according to the present disclosure, and FIG. 2 is a partial exploded view of an electronic device according to the present disclosure. The present disclosure provides an electronic device D, and the electronic device D is, for example, a network sharing router, a router or a miniature base station, and the present disclosure is not limited thereto. The electronic device D includes a housing (not shown), a carrier S and at least one antenna structure arranged on the carrier S. The carrier S and the at least one antenna structure are arranged inside the housing. For the convenience of description and illustration, the housing is omitted in the drawings of the present disclosure. The carrier S may be a support bracket that can be used to carry at least one antenna structure and other electronic components (not shown). The carrier S includes a first plate piece S1, a second plate piece S2 and a third plate piece S3. The first plate piece S1 is perpendicularly connected between the second plate piece S2 and the third plate piece S3, and the second plate piece S2 and the third plate piece S3 are parallel to each other. Further, the surface of the first plate piece S1 is parallel to the YZ plane, and the surfaces of the second plate piece S2 and the third plate piece S3 are parallel to the XZ plane. However, the present disclosure does not limit the specific shape of carrier S thereto.

In addition, it should be noted that the present disclosure does not limit the number of antenna structures. For example, in the present disclosure, the electronic device D has two antenna structures M1 and M2. A part of the antenna structure M1 is arranged on the first board S1 and the other part is arranged on the second board S2. A part of the antenna structure M2 is arranged on the first board S1 and the other part is arranged on the third board S3. The structural shapes of the two antenna structures M1 and M2 are basically the same, so in the following embodiments, only the antenna structure M1 is used as an example for illustration, and the antenna structure M2 is not described herein.

The antenna structure M1 includes a substrate T and a plurality of radiating elements arranged on the substrate T. The substrate T may be an FR4 substrate, a printed circuit board or a flexible printed circuit board (FPCB), and the present disclosure is not limited thereto. In detail, the antenna structure M1 includes a first dipole radiating element 1, a second dipole radiating element 2 and a third dipole radiating element 3. The second dipole radiating element 2 is connected to the first dipole radiating element 1, and the third dipole radiating element 3 is connected to the first dipole radiating component 1 and the second dipole radiating component 2. The first dipole radiating element 1, the second dipole radiating element 2 and the third dipole radiating element 3 may be metal sheets, metal patterns or other conductive bodies with conductive effects.

The substrate T includes a first substrate T1 and a second substrate T2. The first substrate T1 is arranged on the second plate piece S2, and the second substrate T2 is arranged on the first plate piece S1. The first dipole radiating element 1 is arranged on the first substrate T1, in other words, the first dipole radiating element 1 is perpendicular to the XY plane. However, in other embodiments, the first dipole radiating element 1 may also be perpendicular to other planes, such as a YZ plane or an XZ plane, and the present disclosure is not limited thereto. The configuration of the second dipole radiating element 2 and the third dipole radiating element 3 changes when the first dipole radiating element 1 is arranged in different directions.

Figure 3:
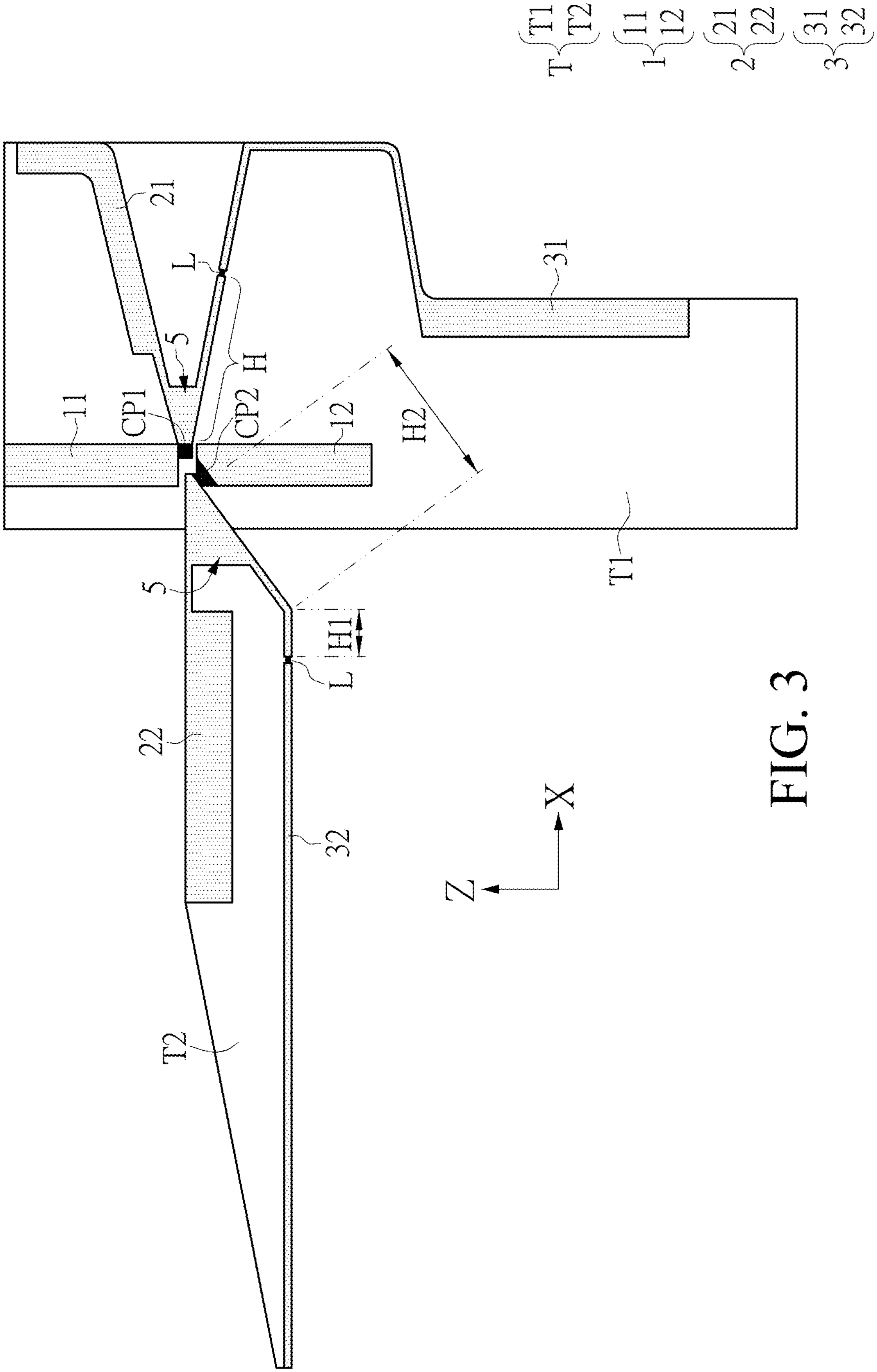
FIG. 3 is a planar schematic diagram of an antenna structure according to the present disclosure.

Refer to FIG. 2 and FIG. 3. FIG. 3 is a planar schematic view of the antenna structure M1 of the present disclosure. The first dipole radiating element 1 includes two first radiating elements 11 and 12 that are not in contact with each other, and the first radiating elements 11 and 12 are arranged on the first substrate T1. The second dipole radiating element 2 includes two second radiating elements 21 and 22 that are not in contact with each other. The second radiating element 21 is arranged on the first substrate T1, and the second radiating element 22 is arranged on the second substrate T2. The third dipole radiating element 3 includes two third radiating elements 31 and 32 that are not in contact with each other. The third radiating element 31 is arranged on the first substrate T1, and the third radiating element 32 is arranged on the second substrate T2. The first radiating element 11, the second radiating element 21 and the third radiating element 31 intersect at the first connection point CP1, and the first radiating element 12, the second radiating element 22 and the third radiating element 32 intersect at the second connection point CP2. In addition, because the space in the electronic device D where the antenna structure M1 can be placed in is limited, when the antenna structure M1 is arranged in the electronic device D, the extension of the radiating element may be restricted by other mechanisms, so in the structural design, the shapes of the two first radiating elements 11 and 12 are symmetrical with each other, the shapes of the two second radiating elements 21 and 22 are asymmetrical, and the shapes of the two third radiating elements 31 and 32 are asymmetrical.

As shown in FIG. 2 and FIG. 3, the antenna structure M1 further includes a feed element 4, and the feed element 4 is electrically connected to the first dipole radiating element 1, the second dipole radiating element 2 and the third dipole radiating element 3. For example, the feed element 4 is a coaxial cable. Further, the feed element 4 includes a feed portion 41 and a ground portion 42. The feed portion 41 is electrically connected to the first connection point CP1, and the ground portion 42 is electrically connected to the second connection point CP2. The feed element 4 feeds a signal to the first connection point CP1 through the feed portion 41, so that the first dipole radiating element 1 is used for generating the first operating frequency band, the second dipole radiating element 2 is used for generating the second operating frequency band, and the third dipole radiating element 3 is used for generating the third operating frequency band. The first to third operating frequency bands cover the full LTE band as well as the 5G NR band. For example, the first dipole radiating element 1 is configured to generate the first operating frequency band containing 5G NR n77 band and LTE band 48, the second dipole radiating element 2 is configured to generate the second operating frequency band containing LTE band 2 and LTE band 66, and the third dipole radiating element 3 is configured to generate the third operating frequency band containing LTE band 5 and LTE band 13. However, the present disclosure does not limit the specific frequency ranges produced by the first to third operating frequency bands. The first operating frequency band is higher than the second operating frequency band, and the second operating frequency band is higher than the third operating frequency band.

Further, the first dipole radiating element 1 generates a first radiation pattern in the high-frequency range (i.e., the first operating frequency band), the second dipole radiating element 2 generates a second radiation pattern in the mid-frequency range (i.e., the second operating frequency band), and the third dipole radiating element 3 generates a third radiation pattern in the low-frequency range (i.e., the third operating frequency band). For example, when the electronic device D of the present disclosure is placed on a horizontal tabletop, the XY plane of FIG. 1 is parallel to the horizontal plane, i.e., the first dipole radiating element 1 is perpendicular to the XY plane (i.e., the horizontal plane). In the present disclosure, the first radiation pattern generated by the first dipole radiating element 1 is omnidirectional radiation in the XY plane, that is to say, the radiation pattern generated by the first dipole radiating element 1 shows a 360° uniform radiation pattern in the horizontal direction. In addition, the polarization direction of the second radiation pattern generated by the second dipole radiating element 2 is orthogonal to the polarization direction of the first radiation pattern, and the polarization direction of the third radiation pattern generated by the third dipole radiating element 3 is orthogonal to the polarization direction of the first radiation pattern.

Figure 4:
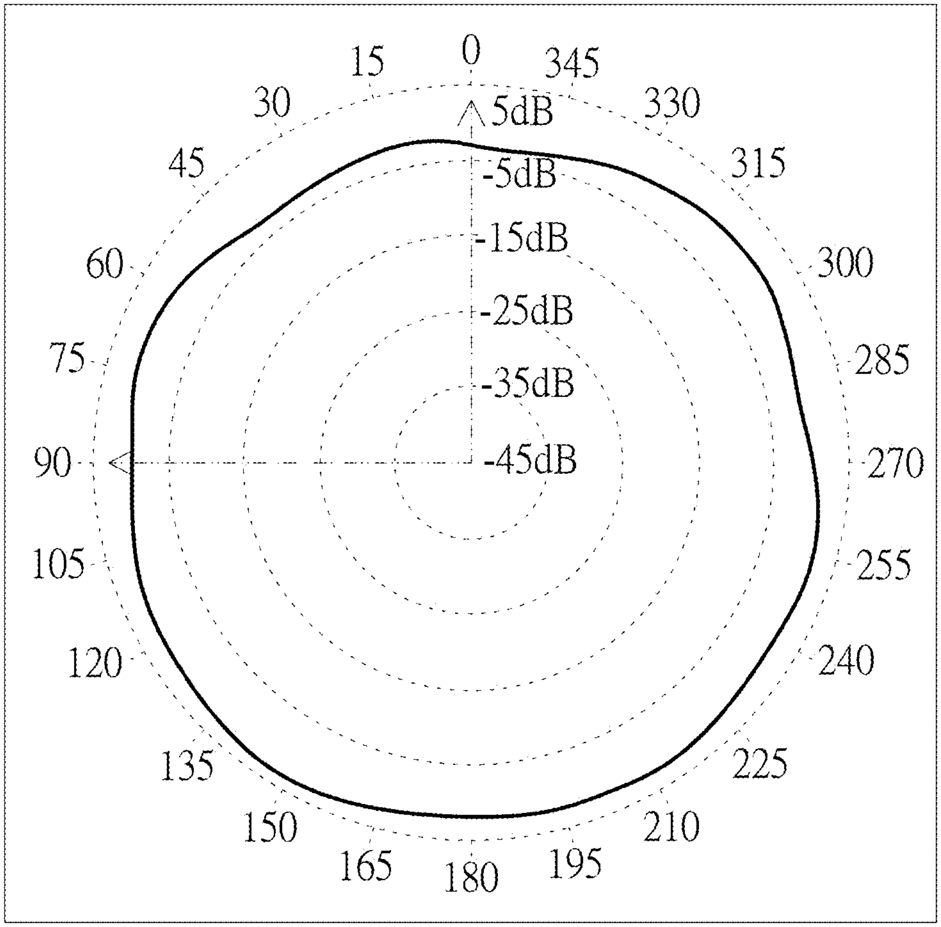
FIG. 4 is a schematic diagram illustrating a radiation pattern on an XY plane generated by an antenna structure operating at a frequency of 3700 MHZ according to the present disclosure.
Figure 5:
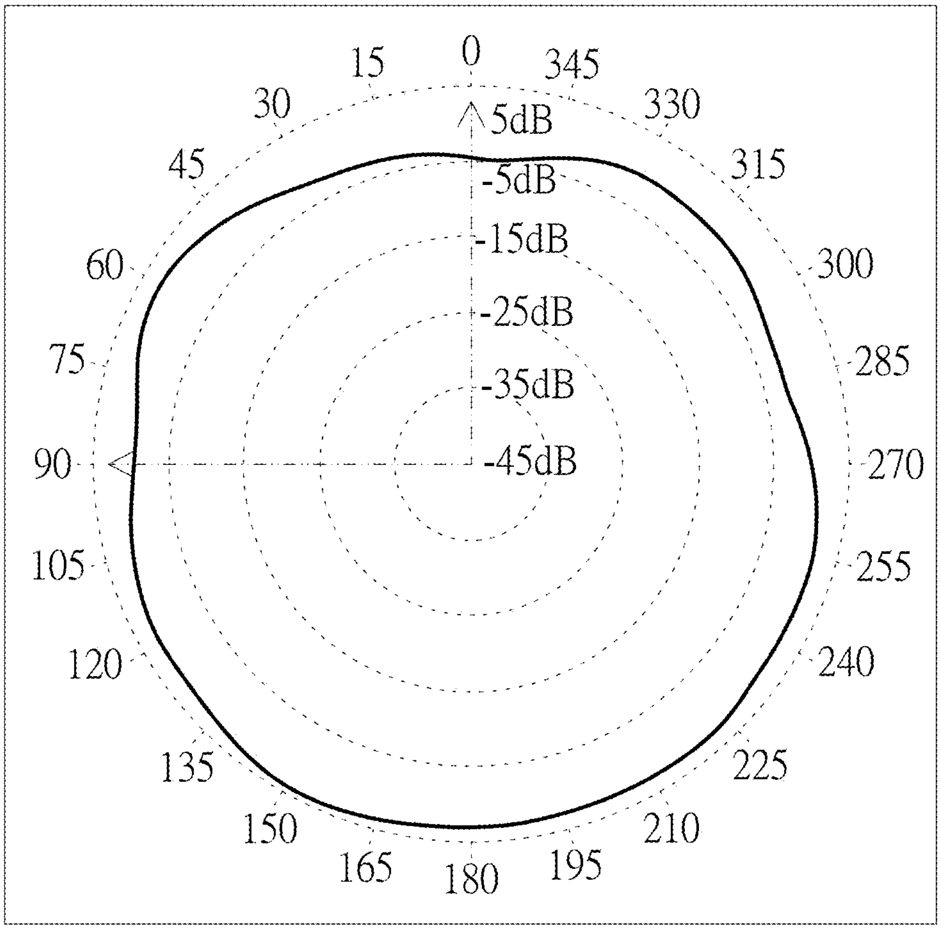
FIG. 5 is a schematic diagram illustrating a radiation pattern on an XY plane generated by an antenna structure operating at a frequency of 4000 MHz according to the present disclosure.

FIG. 4 is a schematic diagram illustrating the radiation pattern of the antenna structure of the present disclosure in the XY plane when the operating frequency is 3700 MHZ, and FIG. 5 is a schematic diagram illustrating the radiation pattern of the antenna structure of the present disclosure in the XY plane when the operating frequency is 4000 MHz. Referring to FIG. 4 and FIG. 5, through the vertical polarization design, the first radiation pattern generated by the first dipole radiating element 1 in the high-frequency range presents omnidirectional radiation in the XY plane, and the radiation gain of the first radiation pattern in the XY plane is greater than −10 dB. More precisely, the radiation gain of the first radiation pattern at the null point of the XY plane is greater than −10 dB, and the null point is defined as the region with the least radiation power in the radiation pattern. That is to say, the first dipole radiating element 1 can maintain a certain radiation efficiency while presenting the omnidirectional radiation pattern in the XY plane. In other words, the present disclosure first arranges the first dipole radiating element 1 to be vertically polarized so as to generate the first radiation pattern in the high-frequency range with omnidirectional characteristics in the XY plane, and then arranges the structure of the second dipole radiating element 2 and the third dipole radiating element 3 to produce orthogonal polarization between the second radiation pattern and the third radiation pattern and the first radiation pattern. As such, the first radiation pattern produced by the first dipole radiating element 1 will not be affected by the second dipole radiating element 2 and the third dipole radiating element 3 and still retains the omnidirectional characteristics.

It should be noted that the antenna structure provided by the present disclosure is not limited to only designs in which the first dipole radiating element 1 is a high-frequency antenna, the second dipole radiating element 2 is a mid-frequency antenna, and the third dipole radiating element 3 is a low-frequency antenna. For example, in another embodiment, the first dipole radiating element 1 may be a high-frequency antenna, the second dipole radiating element 2 may be a low-frequency antenna, and the third dipole radiating element 3 may be a mid-frequency antenna. In other words, as long as the antenna structure includes the vertical polarization design of one of the radiating elements along with the orthogonal polarization design of the other two radiating elements, the radiation patterns generated by each of the radiating elements will not be affected by one another.

Referring to FIG. 3, the shapes of the two first radiating elements 11 of the first dipole radiating element 1 are symmetrical to each other, the shapes of the two second radiating elements 21 and 22 of the second dipole radiating element 2 are asymmetrical, and the shapes of the two third radiating elements 31 and 32 of the third dipole radiating element 3 are asymmetrical. In addition, the antenna structure M1 further includes two coupling elements 5. One of the two coupling elements 5 is connected between the second radiating element 21 and the corresponding third radiating element 31, and the other one of the two coupling elements 5 is connected between the second radiating element 22 and the corresponding third radiating element 32. Through the structural design of the coupling elements 5, the antenna structure M1 can further improve the bandwidth and radiation efficiency in the low-frequency and mid-frequency ranges.

The antenna structure M1 further includes two inductance elements L, which are connected in series to two third radiating elements 31 and 32 respectively. Each inductance element L is designed and configured on the corresponding low-frequency trace. The distance between each inductance element L and the corresponding connection point is exactly one quarter (¼) of the high-frequency wavelength, and this distance is also equal to the length of each first radiating element 11 and 12. In detail, as shown in FIG. 3, the length of the section (the length of the segment H in FIG. 1) of the third radiating element 31 for connecting one of the inductance elements L to the first connection point CP1 is one quarter (¼) of the wavelength of the first operating frequency band. Similarly, the length of the section (the sum of the lengths of section H1 and section H2 in FIG. 1) of the third radiating element 32 for connecting another inductance element L to the second connection point CP2 is one quarter (¼) of the wavelength of the first operating frequency band. Each inductance element L has an inductance value of 5.1 nH. When the high-frequency current passes through the position of the inductance element L of the third radiating element 31 and 32, the inductance element L forms an open circuit state; when the low-frequency current passes through the position of the inductance element L of the third radiating element 31 and 32, the inductance element L forms a short-circuit state. By virtue of the characteristics of the inductance element L, the interference generated by the low-frequency antenna (third dipole radiating element 3) can be suppressed, and the radiation pattern of the high-frequency antenna (first dipole radiating element 1) is not affected by the low-frequency antenna (third dipole radiating element 3). Hence, the radiation pattern of the high frequency (i.e., the first radiation pattern) is further optimized.

Beneficial Effects of the Embodiments

One of the advantages of the antenna structure and electronic device provided by the present disclosure is that the first dipole radiating element, the second dipole radiating element and the third dipole radiating element are connected to each other such that the first dipole radiating element produces an omnidirectional first radiation pattern, and the second and third radiation patterns produced by the second dipole radiating element and the third dipole radiating element are orthogonal to the first radiation pattern. In this way, the first radiation pattern generated by the first dipole radiating element is not affected by the other two dipole radiating elements, and the omnidirectional radiation characteristics can be maintained.

Further, in the conventional technology, the antenna performance may be affected due to the limited internal space of the product. The present disclosure first utilizes the vertical polarization design of the first dipole radiating element 1 to produce the first radiation pattern in the high-frequency range as omnidirectional radiation in the XY plane, and then utilizes the structural design of the second dipole radiating element 2 and the third dipole radiating element 3 to respectively produce the second radiation pattern and the third radiation pattern that are orthogonally polarized to the first radiation pattern. Thus, the first radiation pattern generated by the first dipole radiating element 1 is not affected by the second dipole radiating element 2 and the third dipole radiating element 3, and the omnidirectional radiation characteristics are still retained.

Furthermore, the antenna structure M1 also utilizes two inductance elements L to be connected in series to two third radiating elements 31 and 32 respectively. Each inductance element L is designed and configured to be on the corresponding low-frequency trace. The distance between each inductance element L and the corresponding connection point is exactly one quarter (¼) of the high-frequency wavelength. By virtue of the characteristics of the inductance element L, the interference generated by the low-frequency antenna (third dipole radiating element 3) can be suppressed, so that the radiation pattern of the high-frequency antenna (first dipole radiating element 1) is not affected by the low-frequency antenna (third dipole radiating element 3), and the high-frequency radiation pattern (i.e., the first radiation pattern) is further optimized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a first dipole radiating element, perpendicular to a plane, wherein the first dipole radiating element comprises two first radiating elements;

a second dipole radiating element, connected to the first dipole radiating element, wherein the second dipole radiating element comprises two second radiating elements; and a third dipole radiating element, connected to the first dipole radiating element and the second dipole radiating element, wherein the third dipole radiating element comprises two third radiating elements;

wherein the first dipole radiating element is configured to generate a first radiation pattern, the second dipole radiating element is configured to generate a second radiation pattern, the third dipole radiating element is configured to generate a third radiation pattern, the first radiation pattern is omnidirectional radiation on the plane, a polarization direction of the second radiation pattern is orthogonal to a polarization direction of the first radiation pattern, and a polarization direction of the third radiation pattern is orthogonal to the polarization direction of the first radiation pattern;

wherein one of the two first radiating elements, one of the two second radiating elements, and one of the two third radiating elements intersect at a first connection point, and another one of the two first radiating elements, another one of the two second radiating elements, and another one of the two third radiating elements intersect at a second connection point.

2. The antenna structure according to claim 1, wherein a radiation gain of the first radiation pattern on the plane is greater than −10 dB.

3. The antenna structure according to claim 1, wherein the first dipole radiating element, the second dipole radiating element and the third dipole radiating element respectively generate a first operating frequency band, a second operating frequency band and a third operating frequency band, the first operating frequency band is higher than the second operating frequency band, and the second operating frequency band is higher than the third operating frequency band.

4. The antenna structure according to claim 1, further comprising:

a feed element electrically connected to the first dipole radiating element, the second dipole radiating element and the third dipole radiating element;

wherein the feed element includes:

a feed portion electrically connected to the first connection point; and a ground portion electrically connected to the second connection point.

5. The antenna structure according to claim 1, wherein the two first radiating elements are symmetrical to each other, the two second radiating elements are asymmetrical to each other, and the two third radiating elements are asymmetrical to each other.

6. The antenna structure according to claim 1, further comprising two coupling elements, wherein each of the two coupling elements is connected between one of the two second radiating elements and a corresponding one of the two third radiating elements.

7. The antenna structure according to claim 1, further comprising a first inductance element and a second inductance element, respectively connected in series to the two third radiating elements.

8. The antenna structure according to claim 7, wherein a length of a section of one of the two third radiating elements for connecting the first inductance element and the first connection point is a quarter of a wavelength of the first operating frequency band, and a length of a section of the other one of the two third radiating elements for connecting the second inductance element and the second connection point is a quarter of a wavelength of the first operating frequency band.

9. The antenna structure according to claim 7, wherein an inductance value of each of the two inductance elements is 5.1 nH.

10. An electronic device, comprising:

a carrier; and an antenna structure, disposed on the carrier, and comprising:

a first dipole radiating element, perpendicular to a plane, wherein the first dipole radiating element comprises two first radiating elements;

a second dipole radiating element, connected to the first dipole radiating element, wherein the second dipole radiating element comprises two second radiating elements; and a third dipole radiating element, connected to the first dipole radiating element and the second dipole radiating element, wherein the third dipole radiating element comprises two third radiating elements;

wherein the first dipole radiating element is configured to generate a first radiation pattern, the second dipole radiating element is configured to generate a second radiation pattern, the third radiating element is configured to generate a third radiation pattern, the first radiation pattern is omnidirectional radiation on the plane, a polarization direction of the second radiation pattern is orthogonal to a polarization direction of the first radiation pattern, and a polarization direction of the third radiation pattern is orthogonal to the polarization direction of the first radiation pattern;

wherein one of the two first radiating elements, one of the two second radiating elements, and one of the two third radiating elements intersect at a first connection point, and another one of the two first radiating elements, another one of the two second radiating elements, and another one of the two third radiating elements intersect at a second connection point.

11. The electronic device according to claim 10, where a radiation gain of the first radiation pattern on the plane is greater than −10 dB.

12. The electronic device according to claim 10, wherein the first dipole radiating element, the second dipole radiating element and the third dipole radiating element respectively produce a first operating frequency band, a second operating frequency band and a third operating frequency band, the first operating frequency band is higher than the second operating frequency band, and the second operating frequency band is higher than the third operating frequency band.

13. The electronic device according to claim 10, further comprising:

a feed element, electrically connected to the first dipole radiating element, the second dipole radiating element and the third dipole radiating element;

wherein the feed element includes:

a feed portion electrically connected to the first connection point; and a ground portion electrically connected to the second connection point.

14. The electronic device according to claim 10, wherein the two first radiating elements are symmetrical to each other, the two second radiating elements are asymmetrical to each other, and the two third radiating elements are asymmetrical to each other.

15. The electronic device according to claim 10, wherein the antenna structure further comprises two coupling elements, each of the two coupling elements is connected between one of the two second radiating elements and a corresponding one of the two third radiating elements.

16. The electronic device according to claim 10, wherein the antenna structure further comprises two inductance elements respectively connected in series to the two third radiating elements.

17. The electronic device according to claim 16, wherein a length of a section of each to the two radiating elements for connecting one of the two inductance elements to the first connection point or the second connection point is a quarter of a wavelength of the first operating frequency band.

18. The electronic devices according to claim 16, where each of the two inductance elements has an inductance value of 5.1 nH.

* * * * *